United States Patent [19]

Myles

[11] 4,246,799

[45] Jan. 27, 1981

[54] VACUUM INDICATOR

[75] Inventor: J. Edgar Myles, West Bloomfield, Mich.

[73] Assignee: J. E. Myles, Inc., Troy, Mich.

[21] Appl. No.: 99,960

[22] Filed: Dec. 3, 1979

Related U.S. Application Data

[63] Continuation-in-part of Ser. No. 31,270, Apr. 18, 1979, Pat. No. 4,199,992, which is a continuation of Ser. No. 945,762, Sep. 25, 1978, abandoned.

[51] Int. Cl.$^3$ .............................................. G01L 7/16
[52] U.S. Cl. ..................................................... 73/744
[58] Field of Search .............. 73/744, 745, 746, 146.8, 73/146.3

[56] References Cited

U.S. PATENT DOCUMENTS

| | | | |
|---|---|---|---|
| 3,286,726 | 11/1966 | Guy | 73/744 |
| 3,596,521 | 8/1971 | Guy | 73/744 |
| 3,677,089 | 7/1972 | Martin | 73/744 |
| 3,889,530 | 6/1975 | Bluem | 73/146.8 |
| 3,910,120 | 10/1975 | Martin | 73/744 |
| 4,136,560 | 1/1979 | Gellos | 73/146.8 |

*Primary Examiner*—Donald O. Woodiel

*Attorney, Agent, or Firm*—Cullen, Sloman, Cantor, Grauer, Scott & Rutherford

[57] ABSTRACT

The vacuum indicator has a body with an attachment shank having a fluid passage. A cylinder bore is located in the body and communicates with the passage. An end plug having a bore and a counterbore is threaded into the body. The bore of the end plug terminates at the inner end in a first annular flat abutment surface which faces one end of the body. The counterbore terminates in a second annular flat abutment surface which is located between the inner and outer ends of the plug and forms one end of the plug bore. A piston is nested in the cylinder bore and has a piston rod secured thereto, with the piston rod projecting axially through and outwardly of the end plug. An annular bearing element is located in the plug bore and surrounds the piston rod. The piston has an annular end surface facing the first abutment surface. A compression spring is interposed at its ends between one end of the cylinder bore and the piston and yieldably biases the piston towards the first abutment surface. The piston is variably movable longitudinally against the spring towards said one end of the cylinder bore on application of a vacuum to the fluid passage.

15 Claims, 3 Drawing Figures

VACUUM INDICATOR

CROSS REFERENCES TO RELATED APPLICATIONS

This patent application is a continuation-in-part application of U.S. patent application Ser. No. 031,270, which was filed on Apr. 18, 1979 for PRESSURE INDICATOR, now U.S. Pat. No. 4,199,992, which in turn was a continuation application of U.S. patent application Ser. No. 945,762, filed on Sept. 25, 1978 entitled PRESSURE INDICATOR, now abandoned.

BACKGROUND OF THE INVENTION

Indicators of the type disclosed are known to include metallic body with a threaded attachment shank having a pressure fluid passage adapted for connection to a source of vacuum or pressure to be measured. A cylindrical bore is provided within the body which communicates with the passage and has a threaded open end receiving an end plug having a bore and which is threaded into the body. A piston is nested in the cylinder and has a piston rod axially extending through the cylinder bore and through the plug. A compression spring is interposed between the plug and piston retainingly engaging the piston and the piston being variably movable longitudinally against the spring on application of fluid under pressure, with the extent of movement providing a visual indication of the pressure or vacuum applied. Examples of this type of indicator are shown in U.S. Pat. No. 3,677,089 to Clyde J. Martin, granted July 18, 1972 and U.S. Pat. No. 3,910,210 of Clyde J. Martin, granted Oct. 7, 1975.

SUMMARY OF THE INVENTION

It is a feature of the present invention to provide a vacuum indicator having a body with an attachment shank provided with a pressure fluid passage. A cylinder bore is provided in the body and at one end communicates with the passage. The other end of the body is open and threaded. An end plug with inner and outer ends has a bore and a counterbore and is threaded into the open end of the body. The plug bore terminates at the inner end in a first annular abutment surface which faces said one end of the body. The counterbore of the end plug terminates in a second annular flat abutment surface located between the inner and outer ends of the plug and forms one end of the plug bore.

It is a further feature of the present invention to provide a vacuum indicator of the aforementioned type wherein an integral piston and rod assembly is nested within the cylinder bore, with the elongated piston rod extending axially through the cylinder bore and projecting through and outwardly of the plug. A compression spring is interposed at its ends between the piston and one end of the cylinder bore and yieldably biases the piston against the first abutment surface of the end plug. The piston is variably movable longitudinally against the spring on application of vacuum to the fluid passage.

It is a still further feature of the present invention to provide a vacuum indicator of the aforementioned type wherein an annular bearing element made from a permanently lubricated material is nested within the plug bore, completely fills same and abuts the second abutment surface. The bearing element axially and guidably receives the piston rod.

Another feature of the present invention is to provide a vacuum indicator of the aforementioned type wherein the integral piston and rod assembly includes an elongated tubular piston open at one end to receive the compression spring and closed at the other end to which the piston rod is secured. An elongated tubular spring seat or keeper is located in the tubular piston, is spaced from the side wall of the piston and supports the compression spring.

Still another feature of the present invention is to provide a vacuum indicator of the aforementioned type wherein the cylinder bore intermediate its ends is provided with an annular groove which divides the bore into a vacuum zone at one end of the cylinder bore and a second zone at the other end of the cylinder bore. An annular seal is located in the groove and is sealingly engageable with the piston throughout its movement in the cylinder bore.

A further feature of the present invention is to provide a vacuum indicator of the aforementioned type wherein the wall of the cylinder bore in the vacuum zone is provided with annular fluid balancing grooves for equalizing the vacuum acting around the outer periphery of the piston.

It will be understood that the above drawing illustrates merely preferred embodiments of the invention, and that other embodiments are contemplated within the scope of the claims hereafter set forth.

DETAILED DESCRIPTION OF THE PREFERRED EMBODIMENT

Figure 2:
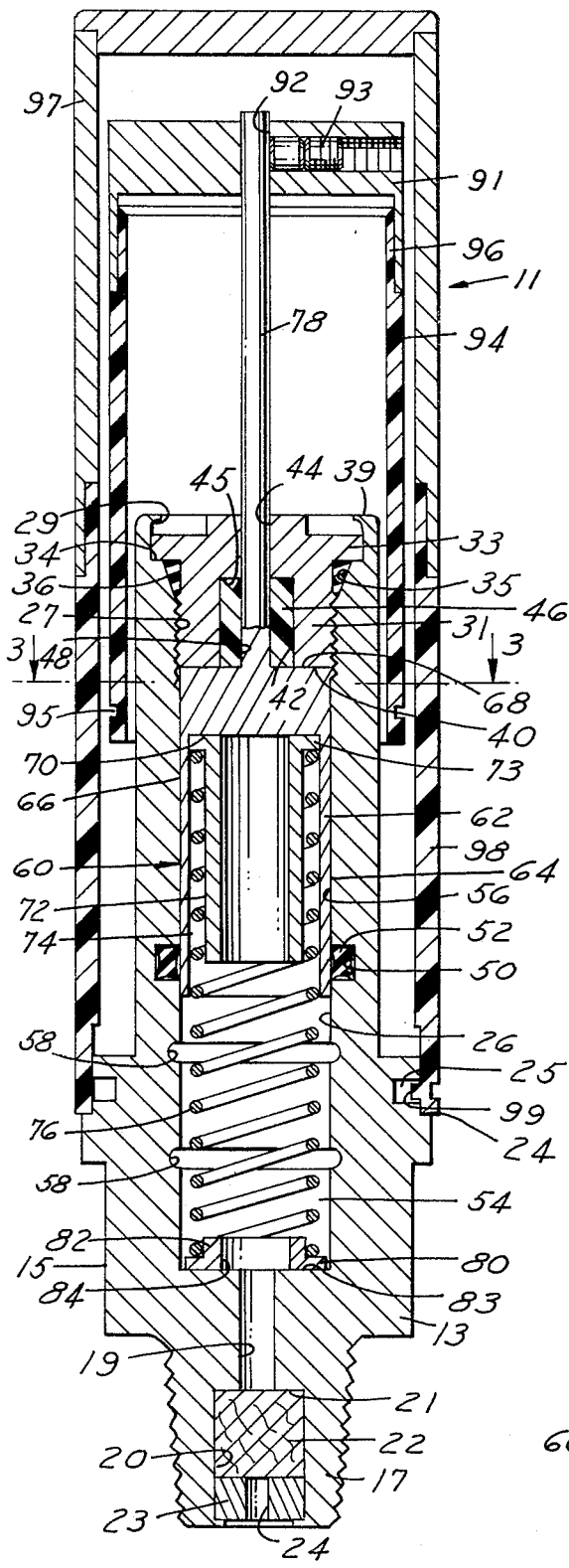
FIG. 2 is a vertical section of the pressure indicator, on an increased scale, and looking in the direction of arrows 2—2 of FIG. 1.
Figure 1:
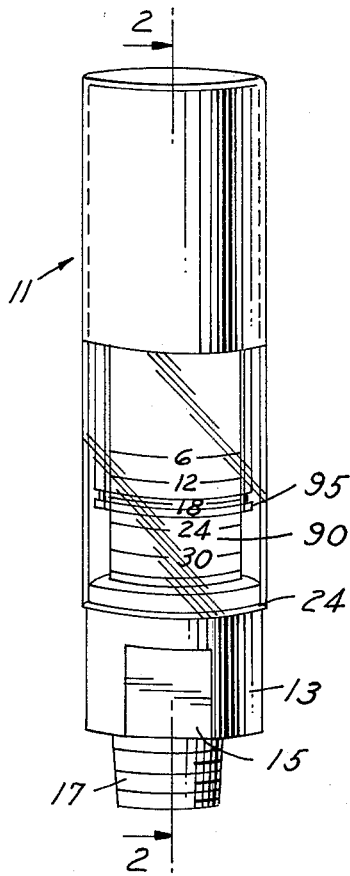
FIG. 1 is a front perspective view of the pressure indicator.
Figure 3:
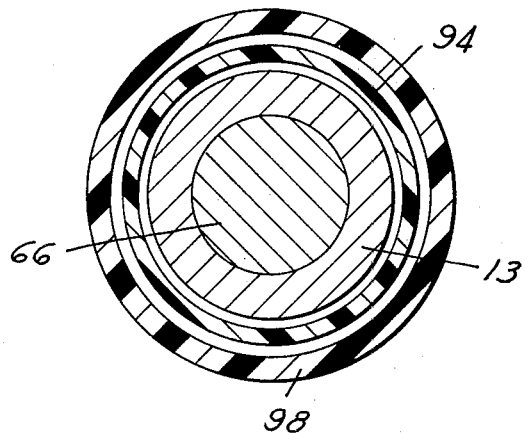
FIG. 3 is a section of the pressure indicator looking in the direction of arrows 3—3 of FIG. 2.

Referring now to the drawing, the vacuum indicator or gauge is designated at 11 in FIGS. 1 and 2, and includes an elongated metallic body 13 of cylindrical form having adjacent its lower end on opposite sides thereof a pair of wrench-engaging flats or flat surfaces 15. The body 13 terminates in the threaded assembly shank 17 having therethrough pressure fluid passage 19. The passage 19 at its outer end is provided with an enlarged bore or cavity 20 having an abutment surface 21. A filter 22 is located in cavity 20 and is held against abutment surface 21 by a restrictor 23 having a passage 24 which is smaller in diameter than passage 19. The filter 22 is made from porous bronze material.

The body 13 includes adjacent the flats 15, an annular stop shoulder 24 and thereabove an annular groove 25 and includes an elongated cylinder bore 26. The upper end of the body 13 has a threaded bore 27 and outwardly thereof a counterbore 29 of increased radius.

End plug 31 is snugly threaded into bore 27 and includes across its top a transverse flange 33 of increased radius. The flange 33 is nested within the counterbore 29 and bears against the adjacent shoulder 34 as shown in FIG. 2.

Below the shoulder 34 is an annular inwardly extending tapered surface 35 which is spaced from the plug 31. An an example, within the space 36 may be placed an O-ring, not shown, which is interposed between the tapered surface 35 and the plug 31. Such O-ring is not normally required in a vacuum gauge.

The upper end of the body 13 adjacent its counterbore 29 has an inturned-portion or stop 39 which is adapted to limit relative outward movement of the flange 33 and plug 31 should an excessive pressure be so applied to the plug 31. In the event the gauge 11 is over-pressurized, the top flange 33 will open to the stop 39 allowing the over-pressure to relieve over a controlled orifice area. This provides a safety relief valve feature preventing uncontrolled explosion or missiling in the event the gauge 11 is over-pressurized.

In the present construction, the plug 31 and the threading therein is constructed to have an excessive shear strength such that, the flange 33 of the plug 31 would actually bend before the threads sheared.

The inner end of the end plug 31 is provided with a first annular flat abutment surface 40 which provides a stop for the piston as appears in FIG. 2 when no vacuum has been applied to the instrument. The end plug 31 has a bore 42 terminating at the surface 40 and a counterbore 44. The counterbore 44 has a second annular flat abutment surface 45 which forms one end of the plug bore 42. An annular bearing elements 46 has a bore 48, abuts the second abutment surface 45 and completely fills the plug bore 42. The bearing against 46 is made from a permanently lubricated material such as Teflon.

The cylinder bore 26 intermediate its ends is provided with an annular groove 50 in which is located an annular seal 52. The groove and seal 52 divides the bore 26 into a vacuum zone 54 at the end of the bore 26 adjacent passage 19 and a second zone 56 on the other side of the seal 52 at the other end of the bore 26.

The vacuum zone 54 of bore 26 has in the wall thereof a pair of annular balancing grooves 58 for providing vacuum around the entire periphery of the piston. Such structure helps to balance the forces on the piston.

The vacuum apparatus 11 includes an integral piston and rod assembly 60 which includes a tubular piston or sleeve 62 open at one end 64 and closed at the other end thereof by the base or cap 66. The base 66 has an outer annular end abutment surface 68 engageable with the first abutment surface 42 provided on the end plug 31 when the instrument 11 is not in use.

Located within the tubular piston 62 and abutting the inner surface 70 of the piston base 66 is a tubular elongated spring seat or keeper 72 which is spaced from the inner surface of the hollow piston 62 to form a space 74 for one end portion of the compression spring 76. The keeper 72 has a spring seat 73 which abuts the piston inner surface 70 and is held against it by the spring 76.

The piston and rod assembly 60 further includes the rod 78 which is secured to and extends away from the outer end abutment surface 68. The rod 78 extends through the bore 48 of the bearing element 46 and the counterbore 44 of the end plug.

Another spring seat 80 provided with a guide 82 is located in the vacuum zone 54 of the body 13 adjacent passage 13. Seat 80 pilots the other end of the compression spring 76 and is held against bore surface 83. The seat 80 has a passage 84 of a diameter larger than passage 19.

The piston 62 has a length equal to or greater than the distance between the quad seal 52 and the end surface 83 of bore 26.

The piston and rod assembly 60 is made from metal while the bearing element 46 is made from a permanently lubricated material such as Teflon.

Applied to the exterior surface of the body 13 is the upright scale 90 for measuring pressures between 0 and 30 inches of mercury, vacuum. In the illustration shown in FIG. 1, the scale indicates merely the pressures 0 to 30 inches of mercury. Additional scales 90 are also applied to the body 13, being 90-degree related therearound whereby, vacuum indications may be read throughout 360 degrees.

The downwardly opening annular inner indicator cap 91 has an axial bore 92 receiving the piston rod 78. The cap 91 is secured to the piston rod 78 by the transverse set screw 93, FIG. 2. Elongated upright scale indicator sleeve 94 of a plastic material, at its upper end projects up into the cap 91 and is secured thereto. The indicator sleeve 94 is arranged outwardly of the upper end of the body 13 therearound, overlies the respective scale or scales 90 and has adjacent its lower end the annular scale reader slot 95.

Accordingly upon the application of a vacuum to the passage 19, there will be a corresponding downward movement of the piston and rod assembly 60 compressing the spring 76 and effecting a corresponding downward longitudinal movement of the scale indicator sleeve 94. So variably elevated depending upon the pressures applied, there can be a direct visual reading of the scales 90 through the annular indicator slot 95 viewed from any direction throughout 360 degrees.

The upper end of the scale indicator sleeve 94 has an annular assembly flange 96 which is frictionally or otherwise projected up into the depending flange of the cap 91 so that the indicator sleeve 94 moves in unison with longitudinal adjustments of piston and rod assembly 60.

A cylindrical enlarged top enclosure 97 of a plastic material is mounted over and around the body 13 and outwardly of the indicator sleeve 94 surrounding the same. The upper portion of top enclosure 97 may be opaque whereas, the lower part of the enclosure 97 includes plastic transparent enclosure member 98 as a part of or connected to top closure 97. The lower end of the enclosure element 98 includes a plurality of circumferentially spaced staked fingers 99 which are located in the annular groove 25 of the body 13 for securing enclosure member 98 to body 13.

The vacuum indicator 11 may be used for testing oils, water, gas, air at high and low temperatures and involving corrosive atmospheres. The indicator 11 reads vacuum up to 30 inches of mercury.

Rather than providing an upright scale 98 with a designated numerical vacuum range on the body 13, a color coded indicator or scale without numbers, consisting of one or more annular bands of different colors, may be employed on the body 13. A suitable decal or label forming the indicator or scale is provided and consists, as an example, of a lower annular green band and an intermediate annular yellow band and/or an upper annular red band. When the indicator sleeve 94 moves upwardly, the annular scale reader slot 95 will first overlie the green band indicating that "all is well" and a vacuum of 18 to 30 inches of mercury, as an example. As the sleeve 94 moves further upwardly, the slot will next overlie the yellow band indicating a "caution" condition and another vacuum range; and finally as the sleeve 94 moves further upwardly the reader slot 95 overlies and exposes the red band indicating a "dangerous" condition and a vacuum in the range, as a example, of 0 to 6 inches of mercury. A gauge with a color coded scale illustrates a spectrum or range of vacuum. Such a gauge serves as a "go" or "no-go" indicator and is used in applications where an exact vacuum "read-out" is not desirable but only an acceptable operating range is required. Other advantages are less down-time by preventing vehicle, machine and tooling breakage and by preventing unauthorized tinkering in many plants when machine operators and other plant personnel tinker with the fluid system operating relief valve. A further advantage is that a person can obtain a 360° system analysis when it is important to monitor the proper operating range. The maximum range of the instrument is stamped or placed on the gauge. It should be appreciated that any number of different "color" bands may be used, with each band generally representing a predetermined number range or spectrums of vacuum settings.

I claim:

1. A vacuum indicator having a body with an attachment shank which is provided with a fluid passage, a cylinder bore at one end communicating with said passage and having the other end opened and threaded, an end plug with inner and outer ends, said plug having a bore and a counterbore snugly threaded into said open other end, the bore of said end plug terminating at said inner end in a first annular flat abutment surface which faces said one end of said body, the counterbore of said end plug terminating in a second annular flat abutment surface located between the inner and outer ends of said plug and forming one end of said plug bore, a piston nested in said cylinder bore having a piston rod secured thereto, said piston rod projecting axially through and outwardly of said end plug, an annular bearing element in said plug bore surrounding said piston rod, said piston having an annular end surface facing said first abutment surface, a compression spring interposed at its ends between said one end of said cylinder bore and said piston yieldably biasing said piston towards said first abutment surface, said piston being variably movable longitudinally against said spring towards said one end of the cylinder bore on application of a vacuum to said fluid passage.

2. The vacuum indicator defined in claim 1 wherein said annular bearing element is made from a permanently lubricated material.

3. The pressure indicator defined in claim 2 wherein said material is Teflon.

4. The vacuum indicator defined in claim 1 wherein said fluid passage is provided with a filter and a restrictor.

5. The vacuum indicator defined in claim 1 wherein said piston is formed integrally with said piston rod, said piston being hollow and closed at one end, said piston rod being secured to and extending away from said closed end of said piston.

6. The vacuum indicator defined in claim 5 wherein a first spring keeper is located within and abuts the closed end of said piston, said keeper piloting one end of said compression spring which urges said piston against said first abutment surface.

7. The vacuum indicator defined in claim 6 wherein a second spring keeper abuts said one end of said cylinder bore, and pilots the other end of said compression spring.

8. The vacuum indicator defined in claim 1 wherein the cylinder bore intermediate its ends is provided with an annular groove which divides said bore into a vacuum zone at said one end of the cylinder bore and a second zone at the other end of the cylinder bore, and an annular seal located in said groove and sealingly engageable with said piston throughout its movement in said cylinder bore to prevent the air in said vacuum zone from entering said second zone.

9. The vacuum indicator defined in claim 8 wherein the wall of said cylinder bore in said vacuum zone is provided with annular fluid balancing grooves.

10. The vacuum indicator defined in claim 8 wherein said piston is elongated and hollow, said piston being closed at the end adjacent said the threaded end of said cylinder bore, said piston having a length equal to or greater than the distance between said annular seal and said one end of said cylinder bore.

11. The vacuum indicator defined in claim 1 wherein said piston rod is made from a material different than said bearing element thereby eliminating binding therebetween.

12. The vacuum indicator defined in claim 1 wherein said body outwardly of its threaded end having a counterbore of increased diameter defining a stop shoulder, a transverse top flange on said end plug nested in the counterbore of said body and bearing against said shoulder, said body longitudinally inward of said shoulder having an annular tapered surface spaced from said plug below said top flange.

13. The vacuum indicator defined in claim 1 wherein an upright scale is imprinted upon the exterior of said body longitudinally thereof, a downturned cap axially receiving and secured to the end of said piston rod, surrounding and spaced outwardly of said body at its upper end, a transparent cylindrical scale indicator secured to and depending from said cap surrounding said body, and an annular scale reader groove formed in said scale indicator registering along the height of said scale for directing reading the vacuum applied to said fluid passage.

14. The vacuum indicator defined in claim 13 wherein there being a series of 90-degree spaced additional scales imprinted on and around said body for readability of vacuum throughout 360 degrees.

15. The vacuum indicator defined in claim 13 wherein there being an annular groove formed in said body adjacent the shank end thereof, a cylindrical enclosure having a transparent portion loosely receiving said scale indicator with its open end bearing against said body adjacent said annular groove, and a plurality of staked fingers provided on said enclosure which are located in said annular groove for securing said enclosure to said body.

* * * * *